US011616955B2

(12) United States Patent
Wan et al.

(10) Patent No.: US 11,616,955 B2
(45) Date of Patent: Mar. 28, 2023

(54) SIGNALING OF RECTANGULAR SLICES IN THE VVC VIDEO COMPRESSION STANDARD

(71) Applicant: Avago Technologies International Sales Pte. Limited, Singapore (SG)

(72) Inventors: Wade Keith Wan, Villa Park, CA (US); Minhua Zhou, San Diego, CA (US); Timothy Moore Hellman, Concord, MA (US); Peisong Chen, San Diego, CA (US); Brian Allen Heng, Irvine, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 17/083,187

(22) Filed: Oct. 28, 2020

(65) Prior Publication Data
US 2022/0021881 A1 Jan. 20, 2022

Related U.S. Application Data

(60) Provisional application No. 63/051,813, filed on Jul. 14, 2020.

(51) Int. Cl.
*H04N 19/119* (2014.01)
*H04N 19/129* (2014.01)
*H04N 19/167* (2014.01)
*H04N 19/176* (2014.01)

(52) U.S. Cl.
CPC ......... *H04N 19/129* (2014.11); *H04N 19/119* (2014.11); *H04N 19/167* (2014.11); *H04N 19/176* (2014.11)

(58) Field of Classification Search
CPC .. H04N 19/129; H04N 19/119; H04N 19/167; H04N 19/176
See application file for complete search history.

(56) References Cited

U.S. PATENT DOCUMENTS

| 2012/0230428 | A1* | 9/2012 | Segall | H04N 19/70 375/240.25 |
| 2015/0229948 | A1* | 8/2015 | Puri | H04N 19/91 375/240.03 |
| 2019/0313108 | A1* | 10/2019 | Zhang | H04N 19/119 |
| 2021/0321088 | A1* | 10/2021 | Kalva | H04N 19/58 |

FOREIGN PATENT DOCUMENTS

KR 2021-0082092 A * 12/2020

* cited by examiner

*Primary Examiner* — Md N Haque
*Assistant Examiner* — Berteau Joisil
(74) *Attorney, Agent, or Firm* — BakerHostetler (57) ABSTRACT

A method includes encoding, by a encoder, a video frame of a versatile-video coding (VVC) video-compression system. The encoder generates/uses tile information associated with a video frame, determines for a slice that the slice is a subset or a superset of a tile based on the tile information, determines slice parameters associated with the slice, and signals the slice parameters associated with the slice. In other aspects, a method may include retrieving, by a decoder of a video-compression system, tile information associated with a video frame, determining, for a slice, that the slice is a subset or a superset of a tile based on the tile information, determining slice parameters associated with the slice, and decoding the video frame using the determined slice parameters.

24 Claims, 9 Drawing Sheets

- 402 — num_slices_in_pic_minus1 plus 1 specifies the number of rectangular slices in each picture referring to the PPS
- 404 — slice_width_in_tiles_minus1[ i ] plus 1 specifies the width of the i-th rectangular slice in units of tile columns
- 406 — slice_height_in_tiles_minus1[ i ] plus 1 specifies the height of the i-th rectangular slice in units of tile rows
- 408 — num_slices_in_tile_minus1[ i ] plus 1 specifies the number of slices in the current tile for the case where the i-th slice contains a subset of bricks from a single tile
- 410 — slice_height_in_ctu_minus1[ i ] plus 1 specifies the height of the i-th rectangular slice in units of CTU rows for the case where the i-th slice contains a subset of bricks from a single tile
- 412 — tile_idx_delta[ i ] specifies the difference in tile index between the i-th rectangular slice and the (i+1)-th rectangular slice. The value of tile_idx_delta[ i ] shall not be equal to 0

SIGNALING OF RECTANGULAR SLICES IN THE VVC VIDEO COMPRESSION STANDARD

CROSS-REFERENCES TO RELATED APPLICATIONS

This application claims priority to and the benefit of U.S. Provisional Patent Application No. 63/051,813, filed Jul. 14, 2020, which is hereby incorporated by reference in its

TECHNICAL FIELD

The present description relates generally to video coding and, in particular, to the signaling of rectangular slices in the versatile-video coding (VVC) video-compression standard.

BACKGROUND

Versatile-video coding (VVC) is a new video-compression standard under development by the Joint Video Experts Team (WET). VVC provides an average reduction of roughly half the bitrate compared to the previous generation of codecs, such as high-efficiency video coding (HEVC), to achieve similar visual quality. As a result of VVC compression, an ultra-high density (UHD) video delivered with bitrates of up to 15 megabits per second (Mbps) will likely require less than 8 Mbps when VVC implementations are available and mature.

Current Bjontegaard-delta (BD)-rate figures on VVC coding efficiency, based on peak signal-to-noise ratio (PSNR), tend to confirm that the above gain can be achieved, showing bit rate reductions of about 37% on average for UHD content. Another important aspect is the tradeoff between performance, in terms of computational complexity and coding efficiency. The VVC test model (VTM), the reference software implementation adopted and developed by JVET, in version 5, shows an increase in complexity of almost 10 times for the encoder and less than two times for the decoder.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description, which includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

The subject technology is directed to methods and systems for signaling rectangular slices in the versatile-video coding (VVC) video-compression standard. Slices and tiles are two different types of partitioning that are defined in the bitstream and are necessary for subsequent pixel processing. The VVC standard has specific constraints on how these two partitioning structures can be defined relative to one another that are different than in previous standards. The subject technology specifies how these partitioning structures are signaled in the bitstream. The subject solution starts with the first slice and then determines whether it is a subset of a tile or a superset of a tile, which allows for logically specifying the dimensions of each slice.

An advantageous feature of the disclosed solution is that it is a cleaner architectural solution, and its design prevents illegal partitions to be constructed by directly requiring each slice to be signaled as a number of complete tiles or as a specific type of subset within a tile. The subject technology signals dimensions and locations of rectangular slices directly by using tile information rather than bricks. Each brick contains an integer number of CTUs. All bricks are rectangular shaped, and all CTUs within the brick are scanned in a raster-scan order. Bricks are horizontal sub-partitions of a tile. Specifically, each tile can be split horizontally into one or more bricks. The brick-width is always equal to the tile-width. A tile that is not split may still be referred to as a brick. Each coding-tree unit (CTU) row can potentially be a brick boundary. A picture parameter set (PPS) for an 8K picture with 64×64 CTUs potentially has 8,192 bricks. The disclosed technology removes the need to predefine and store brick information at the PPS level, causes no change to the slice and brick partitioning options and only affects the signaling. The subject solution can be used by any encoder to properly signal the slice partitioning to a decoder.

Figure 1:
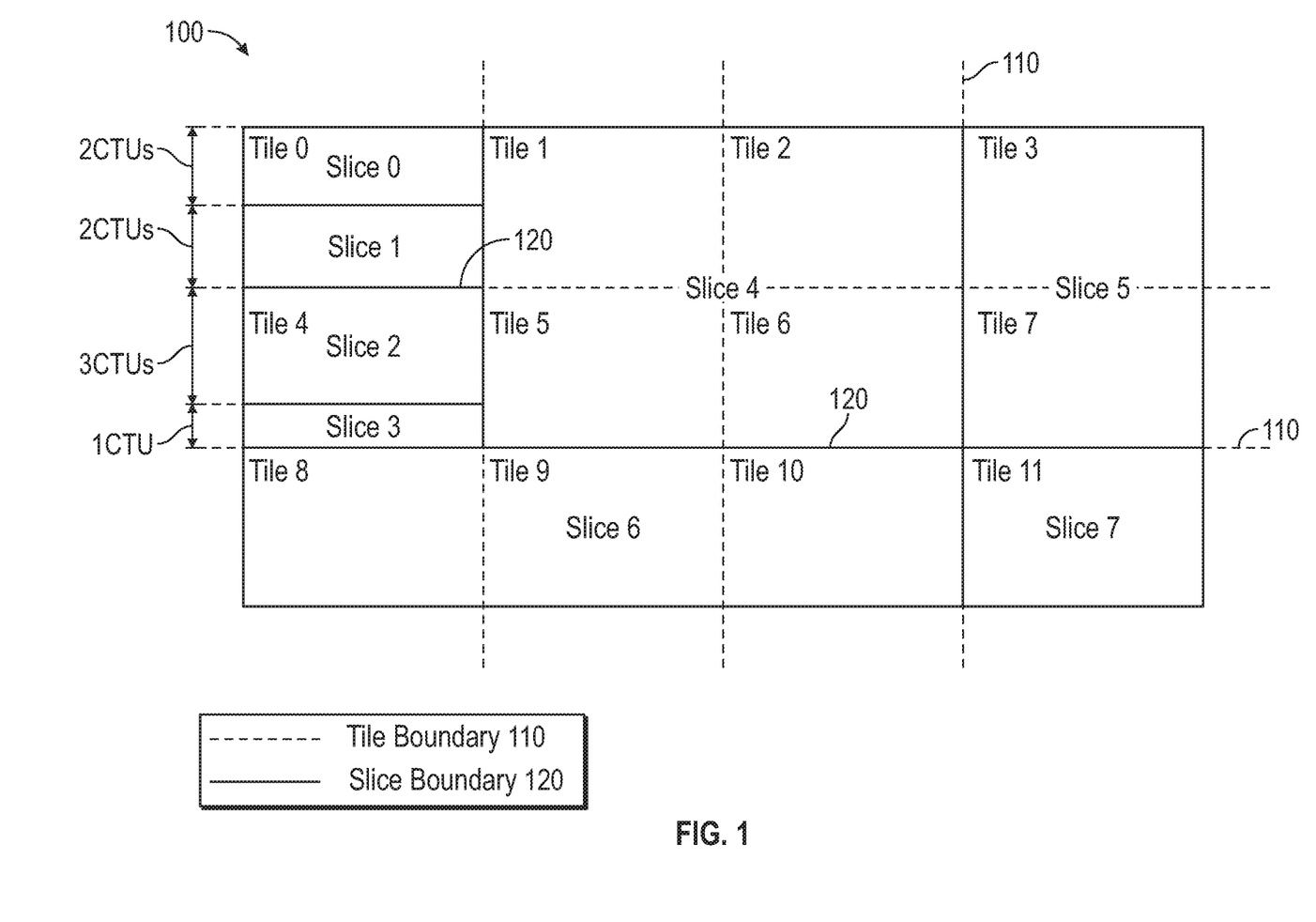
FIG. 1 is a schematic diagram illustrating an example representation of partitioning of tiles and slices, in accordance with some implementations of the subject technology.

FIG. 1 is a schematic diagram illustrating an example representation of the partitioning 100 of tiles and slices, in accordance with some implementations of the subject technology. The example partitioning 100 includes 12 tiles (tile 0 to tile 11) and eight slices (slice 0 to slice 7). The tile boundaries 110 are shown as dotted lines and the slice boundaries 120 are shown as black solid lines. Slices 0 and 1 each include two CTU rows and they share tile 0, and slices 2 and 3 include three CTU rows and one CTU row, respectively, and they share tile 4. Slice 4 includes tiles 1, 2, 5 and 6; slice 5 contains tiles 3 and 7; slice 6 includes tiles 8, 9 and 10; and slice 7 consists of tile 11. The signal method of the subject technology uses tile information to directly signal dimensions (in terms of number of CTU rows) and locations of rectangular slices without affecting the slice and brick partitioning options and without using the brick information.

Figure 2A:
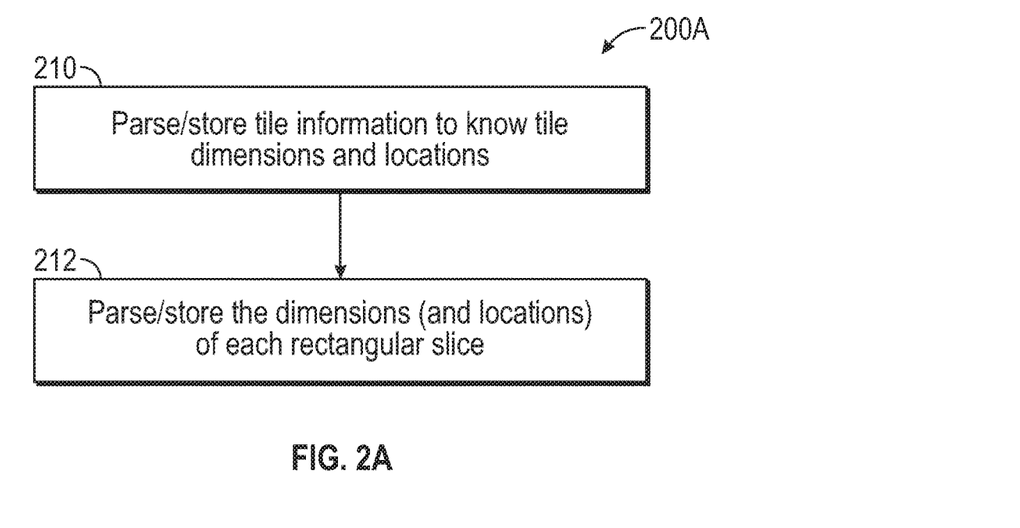
FIGS. 2A and 2B are high-level flow diagrams illustrating an example of a signaling method, in accordance with some implementations of the subject technology and an existing signaling method.
Figure 2B:
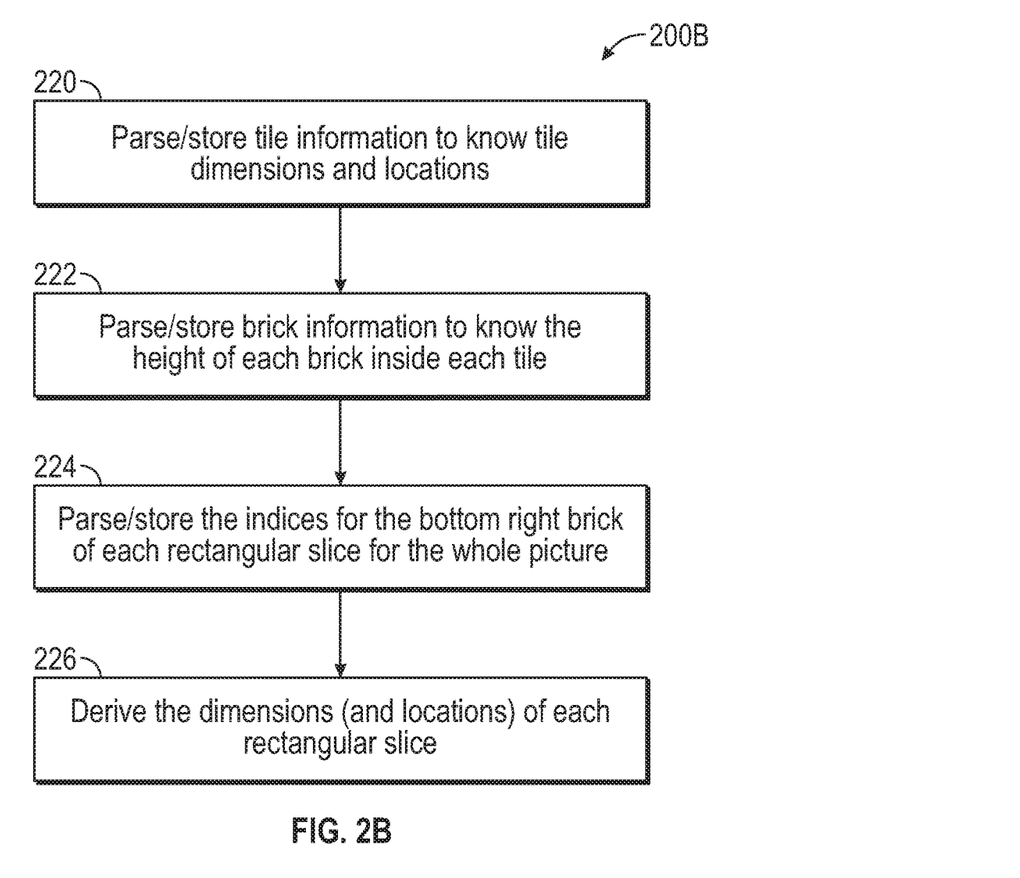

FIGS. 2A and 2B are high-level flow diagrams 200A and 200B illustrating an example of a signaling method, in accordance with some implementations of the subject technology and an existing signaling method. The high-level flow diagram 200A starts at operation block 210, where the PPS embedded (by an encoder) in the stream is parsed by a decoder (e.g., a decoder of an electronic communication device such as a smartphone or smartwatch, a set-top box such as a digital versatile disk (DVD) or a Blu-ray, a videogame console a server, a desktop computer, a laptop computer, or a smartTV) to retrieve tile information, such as tile dimensions and locations. At operation block 220, the decoder parses the slice information, such as slice dimensions and locations. The slice information is encoded and stored by the encoder (e.g., an encoder of an electronic communication device such as a smartphone or smartwatch, a set-top box such as a DVD or a Blu-ray, a videogame console a server, a desktop computer, a laptop computer, or a smartTV). Therefore, in the disclosed solution, the encoder encodes and stores only the tile information and the slice information, which are retrieved by the decoder. In one or more implementations, the encoder and the decoder of the subject technology may include software applications that are used to perform the corresponding functionalities.

The flow diagram 200B is an existing signaling solution with at least two additional steps compared to the disclosed signaling method of flow diagram 200A. The flow diagram 200B starts at operation block 220, which is similar to the operation block 210 of the flow diagram 200A. At operation block 222, the decoder parses the brick information, such as the height of each brick inside each tile, which is encoded by the encoder. At operation block 224, the decoder parses the indices for the bottom-right brick of each rectangular slice for the entire picture. At operation block 226, the decoder derives the dimensions and locations of each rectangular slice.

Comparing the signaling method of flow diagram 200A with the existing signaling method of flow diagram 200B, it becomes clear that the disclosed signaling method is a cleaner and faster solution and can be implemented using less complex encoders and decoders.

Figure 3:
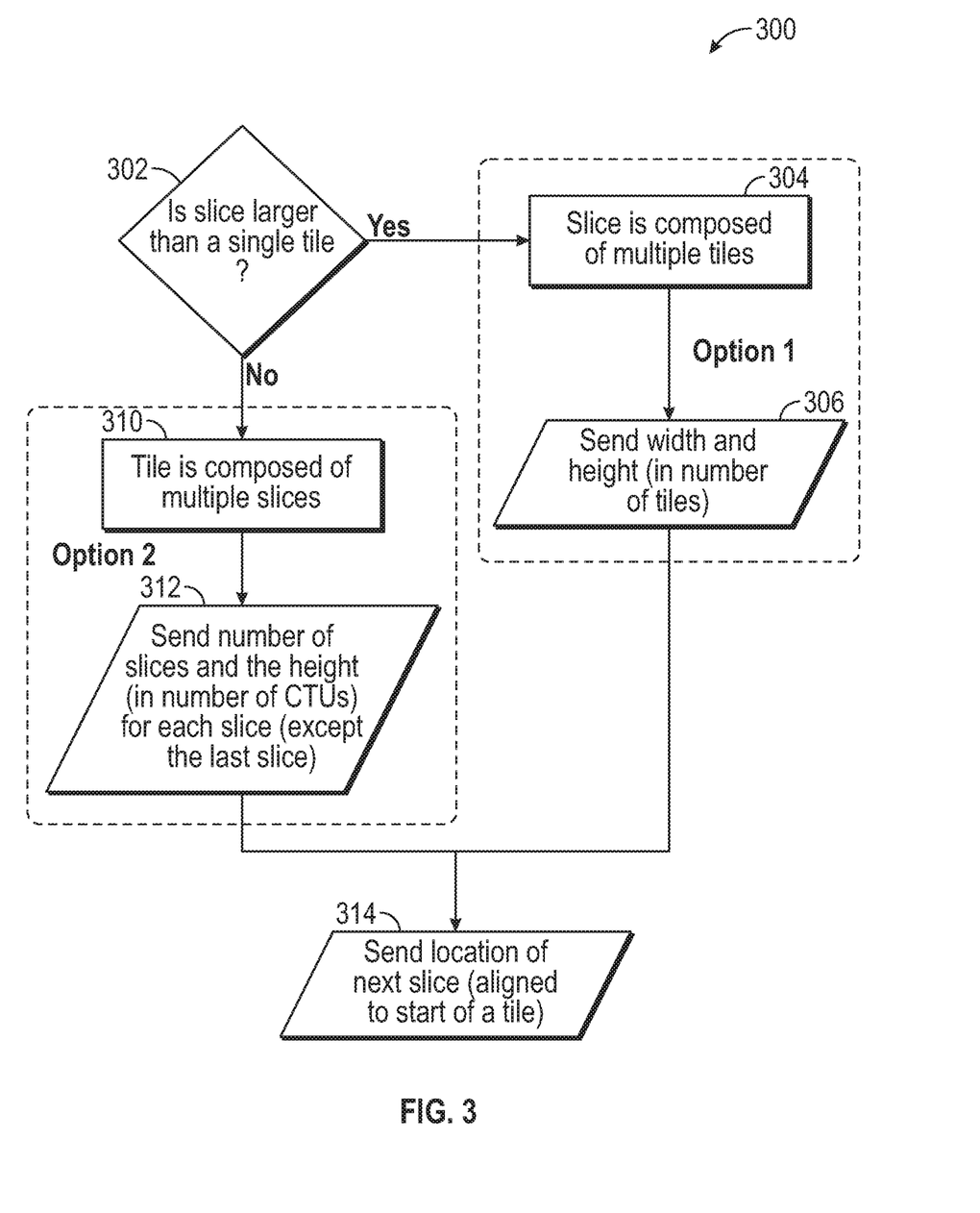
FIG. 3 is a flow diagram illustrating an example of a signaling method of rectangular slices in the VVC video-compression standard, in accordance with some implementations of the subject technology.

FIG. 3 is a flow diagram illustrating an example of a signaling method 300 of rectangular slices in the VVC video-compression standard, in accordance with some implementations of the subject technology. The signaling method 300 sends widths and heights of the tiles if the slice is composed of multiple tiles, and sends the number of slices and the height for each slice if the slice is less than or equal to a single tile. The signaling method 300 starts at control operation block 302, where the decoder checks whether the current slice is larger than a single tile. This is done based on tile and slice information stored by the encoder. If the current slice is larger than a single tile (option 1), at operation block 304 it is determined that the slice includes more than one tile, and, at operation block 306, slice dimensions, including a slice width and a slice height in terms of number of tiles, are saved for further processing by a processor (e.g., a processor of a host device, such as a wireless communication device) and control is passed to operation block 314. For example, slice 4 of FIG. 1 includes four tiles (tiles 1, 2, 5 and 6), and the width and height of slice 4 are both two tiles, and for slice 6 the width is three (tiles 8 through 10) and the height is one. If the slice is not larger than a tile (option 2), at operation block 310 it is determined that the current tile includes multiple slices, and at operation block 312 the number of slices included in the tile and the slice height (in terms of number of CTUs) for each slice, except for the last slice, is saved for further processing by a processor and control is passed to operation block 314. At operation block 314, the location of the next slice (aligned to the start of a next tile) is sent for continuation of decoding. By defining rectangular slices as proposed above, it is no longer necessary to predefine the entire brick structure of the picture ahead of time. Additional brick splitting can be supported "in-line" by using an end-of-brick syntax element to indicate whether each CTU row is the end of the current brick.

The signaling method 300 can be implemented by an encoder and the decoder can similarly decode the picture data by using the signaling method 300. It is understood that the structure of the picture in terms of tiles is already set up and, according to the disclosed solution, the encoder utilizes the tile information to set up slice information, for example, to specify the way that the slices are either fit inside a tile or constitute multiple tiles, and the decoder uses this information to decode the picture data. While the tile structure is generally fixed for at least a number of pictures, the slice structure may change for different pictures or stay the same for long periods.

Figure 4:
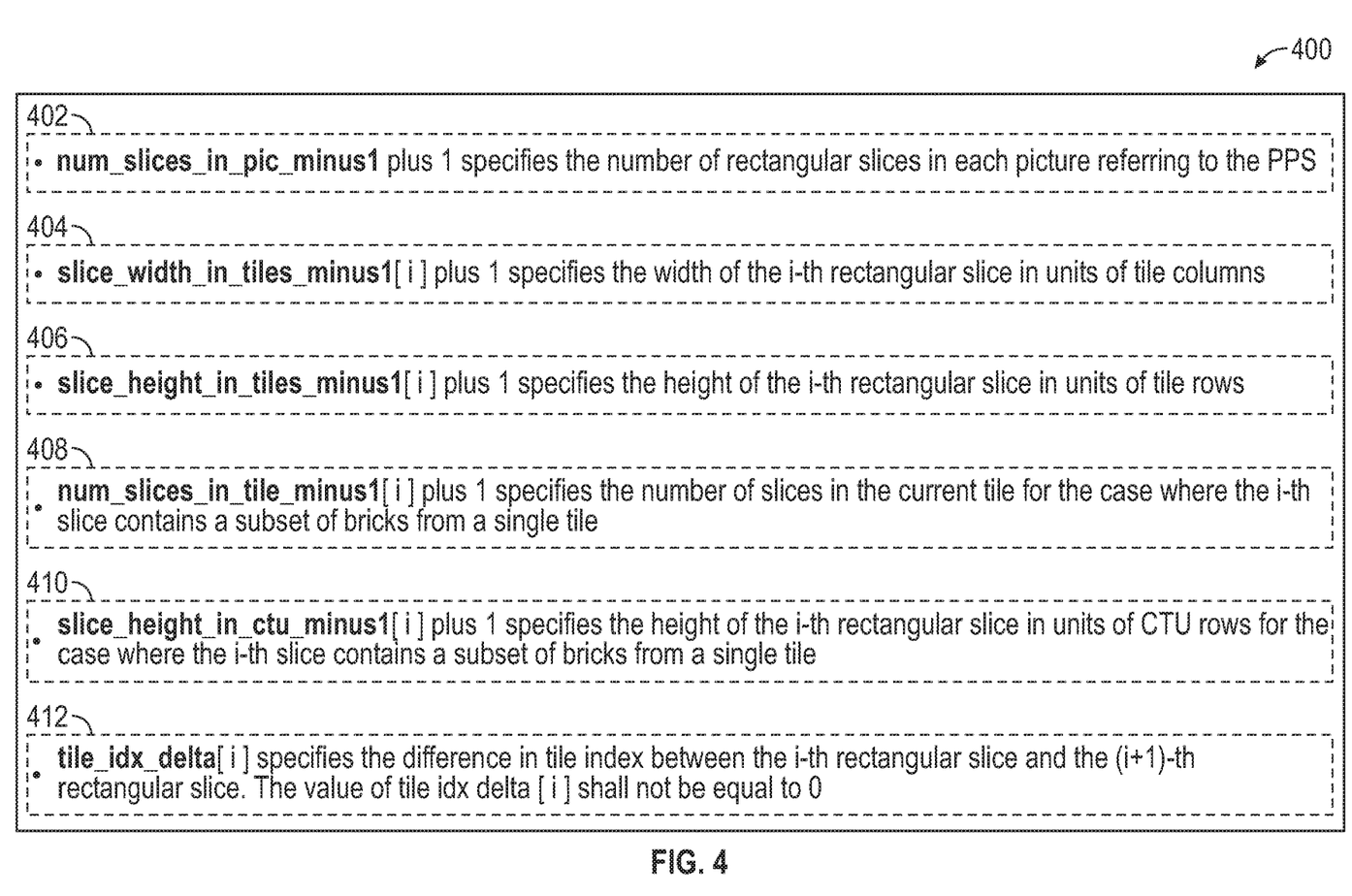
FIG. 4 illustrates an overview of examples of a set of syntax elements used for signaling, in accordance with some implementations of the subject technology.

FIG. 4 is a diagram illustrating an overview of examples of a set of syntax elements 400 used for signaling, in accordance with some implementations of the subject technology. The set of syntax elements 400 is a summarized version of the semantics for the disclosed syntax elements, including syntax elements 402, 404, 406, 408, 410 and 412. The syntax element 402 specifies the number of rectangular slices in each picture, minus one. For example, for the partitioning 100 of FIG. 1, the number of slices is eight, thus the value of syntax element 402 is equal to six (8−1=7). The syntax element 404 specifies the width of the i-th rectangular slice in units of tile columns minus one. For instance, for slice 4 of the partitioning 100, the value of the syntax element 404 is equal to one (2−1=1). The syntax element 406 specifies the height of the i-th rectangular slice in units of tile rows, minus one. For instance, for slice 5 of the partitioning 100, the value of the syntax element 406 is equal to two (2−1=1). The syntax element 408 specifies the number of slices in the current tile for the case where the i-th slice contains a subset of bricks from a single tile, minus one. For example, for slices 0 or 2 of the partitioning 100, the values of the syntax element 408 are equal to one (2−1=1). The syntax element 410 plus one specifies the height of the i-th rectangular slice in units of CTU rows for the case where the i-th slice contains a subset of bricks from a single tile. For example, for slice 2 of the partitioning 100, the value of the syntax element 410 is equal to 2 (3−1=2). The syntax element 412 specifies the difference in tile index between the i-th rectangular slice and the (i+1)-th rectangular slice. For instance, for slice 4 of the partitioning 100, the values of the syntax element 412 is equal to five (1−4=−3).

Figure 5:
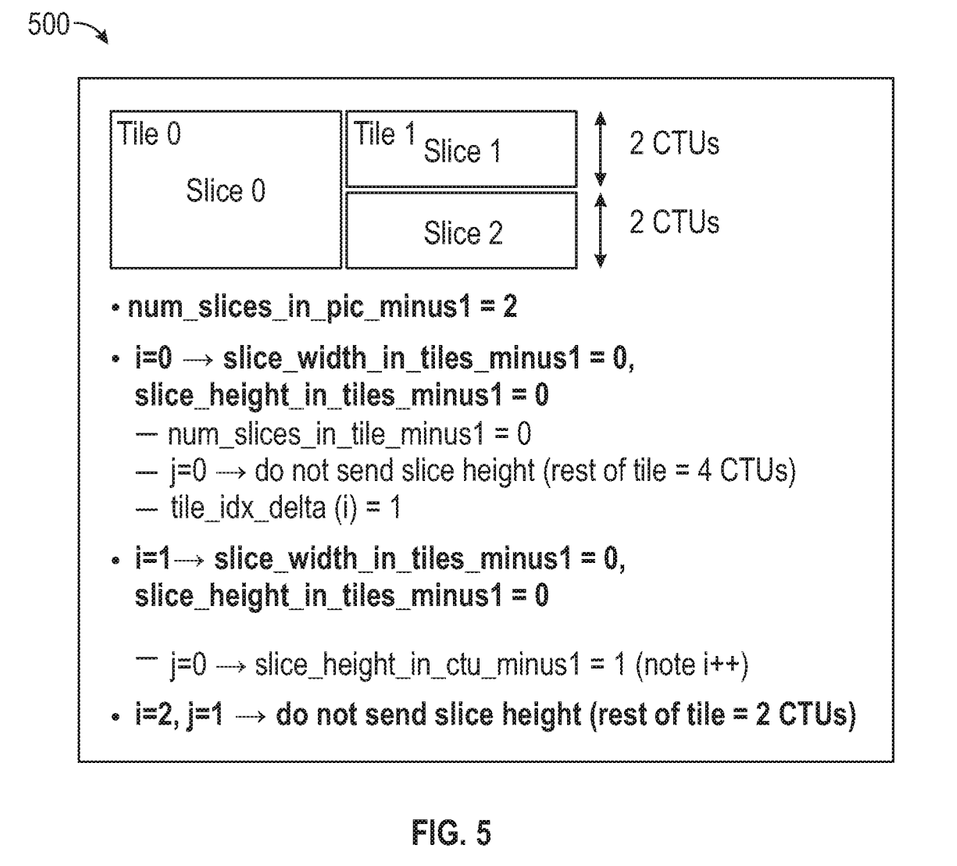
FIG. 5 is a schematic diagram illustrating an example of a slice structure of a picture along with corresponding syntax elements, in accordance with some implementations of the subject technology.

FIG. 5 is a schematic diagram illustrating an example of a slice structure 500 of a picture along with corresponding syntax elements, in accordance with some implementations of the subject technology. The picture slice structure includes two tiles (Tile 0 and Tile 1) partitioned into three slices (slice 0, slice 1 and slice 2). Tile 0 includes slice 0 and tile 1 includes slices 1 and 2. Also shown in FIG. 5 are corresponding syntax elements for the picture slice structure. The indices i and j are used for identifying slices. Based on the descriptions of the syntax elements of FIG. 4, the syntax elements of FIG. 5 should be self-explanatory. It is noted that the height for the last slice (slice 2 of tile 1, i=2 and j=1) is not sent, as mentioned with regard to operational block 312 of FIG. 3.

Figure 6A:
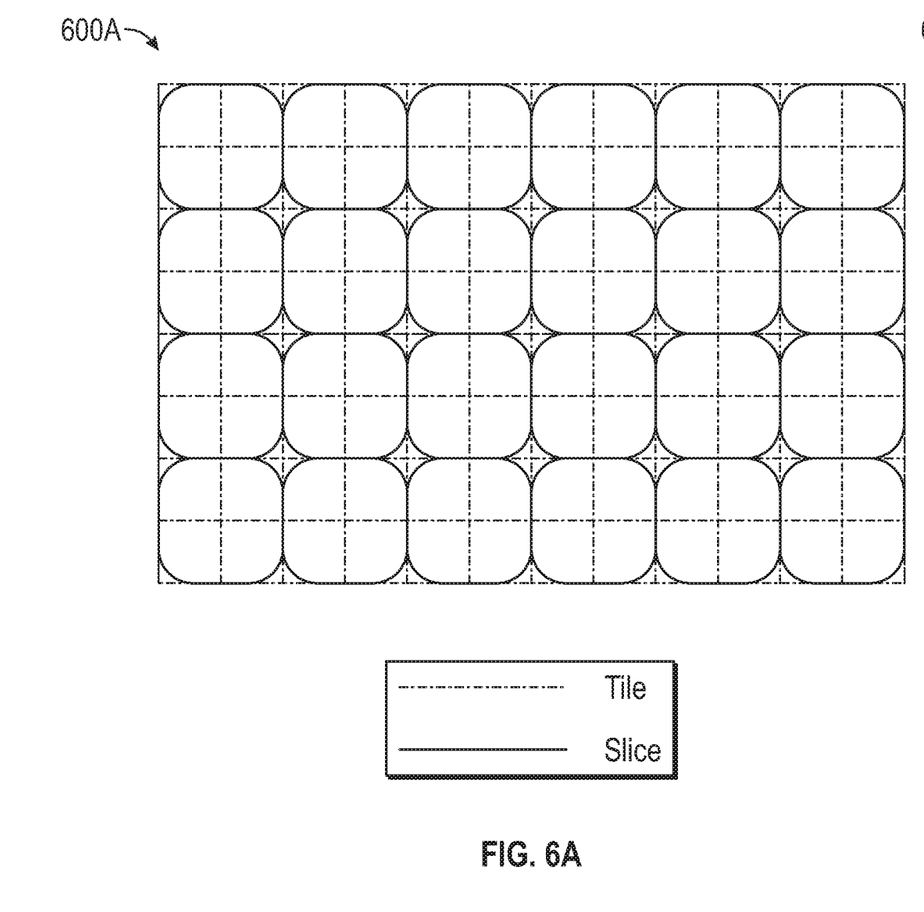
FIGS. 6A and 6B are schematic diagrams illustrating examples of slice structures of pictures, in accordance with some implementations of the subject technology.
Figure 6B:
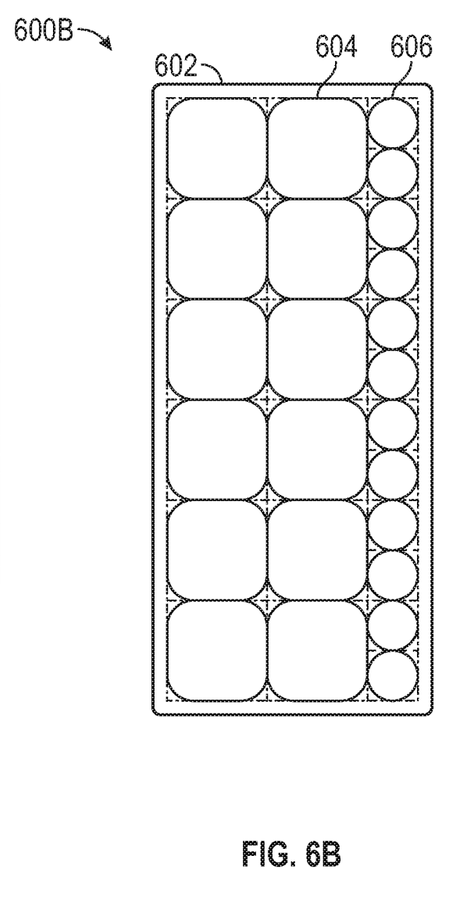

FIGS. 6A and 6B are schematic diagrams illustrating examples of slice structures of pictures 600A and 600B, in accordance with some implementations of the subject technology. The slice structure of picture 600A includes 96 (12×8) tiles configured into 24 slices. The slices have equal width (two tiles) values and equal height (two tiles) values. Therefore, the values of syntax elements 404, and 406 of FIG. 4 for the slices of picture 600A are the same.

The slice structure of picture 600B includes 18 tiles consisting of three columns 602, 604 and 606, each with six rows, configured into 24 slices. The slices in columns 602 and 604 each contain a single tile, and tiles of the column 606 each include two slices. Therefore, the values of syntax elements 404, and 406 of FIG. 4 for the slices of columns 602 and 604 are the same.

Figure 7:
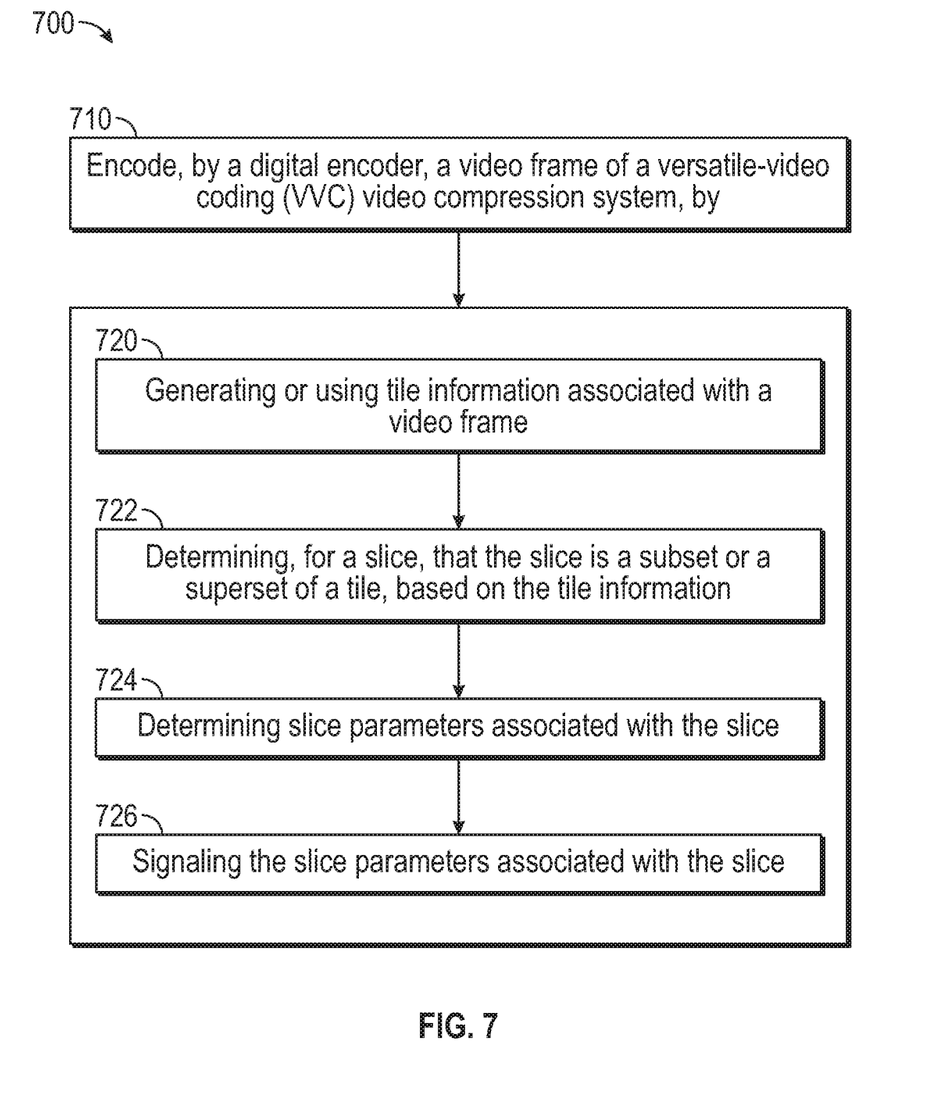
FIG. 7 is a flow diagram illustrating an example of an encoding method, in accordance with some implementations of the subject technology.

FIG. 7 is a flow diagram illustrating an example of a signaling method 700, in accordance with some implementations of the subject technology. The signaling method 700 includes encoding, by a digital encoder (e.g., 960 of FIG. 9), a video frame (e.g., 100 of FIG. 1) of a VVC video-compression system (710). The encoder generates or uses tile information associated with a video frame (720), determines for a slice (e.g., slice 0 through slice 7 of FIG. 1) that the slice is a subset (e.g., slice 0 or slice 1 of FIG. 1) or a superset (e.g., slice 6 of FIG. 1) of a tile (e.g., tiles 8 and 9 of FIG. 1) (722), and based on the tile information, determines slice parameters associated with the slice (724) and signals the slice parameters associated with the slice (726).

Figure 8:
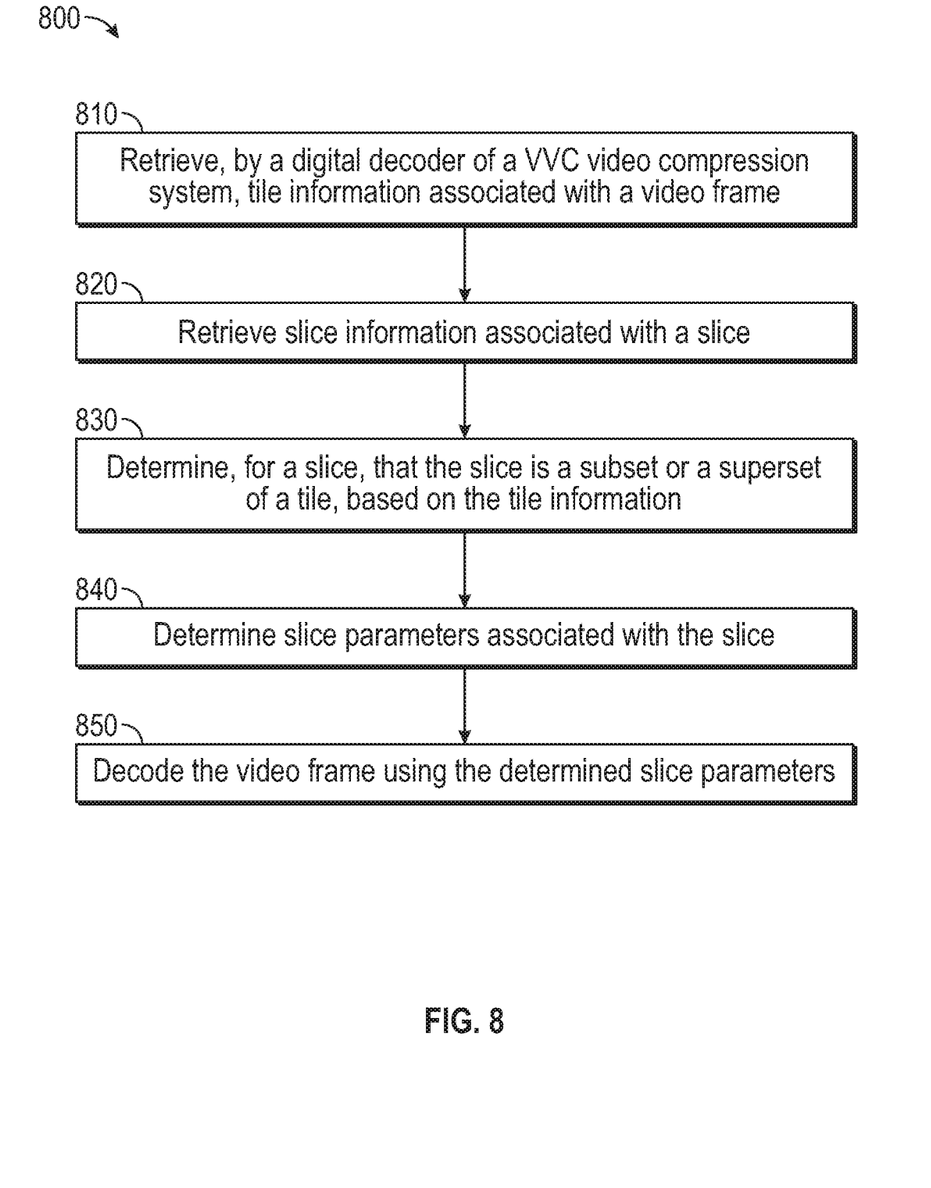
FIG. 8 is a flow diagram illustrating an example of a decoding method, in accordance with some implementations of the subject technology.

FIG. 8 is a flow diagram illustrating an example of a decoding method 800, in accordance with some implementations of the subject technology. The decoding method 800 includes retrieving, by a digital decoder (e.g., 960 of FIG. 9) of a VVC video-compression system, tile information associated with a video frame (e.g., 100 of FIG. 1) (810), retrieving slice information associated with a slice (e.g., 400 of FIG. 4) (820), and determining, for a slice (e.g., slice 0 through slice 7 of FIG. 1), that the slice is a subset (e.g., slice 2 or slice 3 of FIG. 1) or a superset (e.g., slice 4 of FIG. 1) of a tile (e.g., tiles 1, 2, 5 and 6), based on the tile information (830). The decoding method 800 further includes determining slice parameters associated with the slice (840) and decoding the video frame using the determined slice parameters (850).

Figure 9:
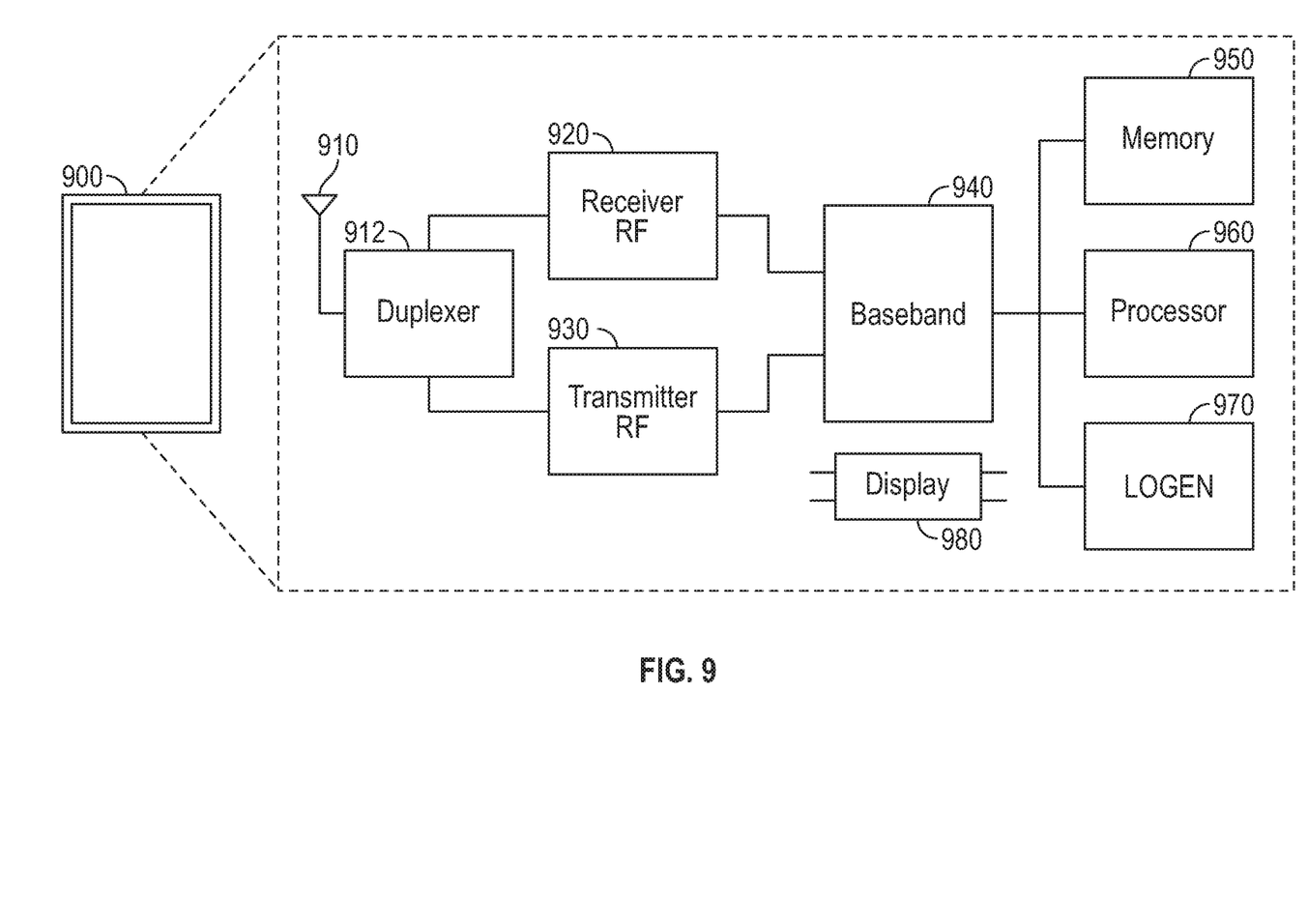
FIG. 9 illustrates an example electronic system within which aspects of the subject technology can be implemented.

FIG. 9 illustrates an example electronic system 900 within which aspects of the subject technology can be implemented. In one or more implementations, the electronic system device 900 can be wireless or a consumer electronic device or a wired communication system. For example, the electronic system 900 can be a smartphone, a smartwatch, a tablet, a laptop, a set-top box such as a digital versatile disk (DVD) or a Blu-ray, a videogame console a server, a desktop computer, a laptop computer, or a smartTV. The electronic system 900 may comprise a radio-frequency (RF) antenna 910, a duplexer 912, a receiver 920, a transmitter 930, a baseband (BB)-processing block 940, a memory 950, a processor 960, a local oscillator generator (LOGEN) 970, and a display 980. In various embodiments of the subject technology, one or more of the blocks represented in FIG. 9 may be integrated on one or more semiconductor substrates. For example, the blocks 920-970 may be realized in a single chip or a single system on a chip, or may be realized in a multichip chipset.

The receiver 920 may comprise suitable logic circuitry and/or code that may be operable to receive and process signals from the RF antenna 910. The receiver 920 may, for example, be operable to amplify and/or downconvert received wireless signals. In various embodiments of the subject technology, the receiver 920 may be operable to cancel noise in received signals and may be linear over a wide range of frequencies. In this manner, the receiver 920 may be suitable for receiving signals in accordance with a variety of wireless standards, such as Wi-Fi, WiMAX, Bluetooth, and various cellular standards. In various embodiments of the subject technology, the receiver 920 may not use any saw-tooth acoustic wave filters and may use either few or no off-chip discrete components such as large capacitors and inductors.

The transmitter 930 may comprise suitable logic circuitry and/or code that may be operable to process and transmit signals from the RF antenna 910. The transmitter 930 may, for example, be operable to upconvert BB signals to RF signals and amplify RF signals. In various embodiments of the subject technology, the transmitter 930 may be operable to upconvert and amplify BB signals processed in accordance with a variety of wireless standards. Examples of such standards may include Wi-Fi, WiMAX, Bluetooth, and various cellular standards.

The duplexer 912 may provide isolation in the transmit band to avoid saturating the receiver 920 or damaging parts of the receiver 920, and to relax one or more design requirements of the receiver 920. Furthermore, the duplexer 912 may attenuate the noise in the receive band. The duplexer 912 may be operable in multiple frequency bands of various wireless standards.

The BB-processing block 940 may comprise suitable logic, circuitry, interfaces, and/or code that may be operable to perform processing of baseband signals. The BB-processing block 940 may, for example, analyze received signals and generate control and/or feedback signals for configuring various components of the electronic system 900, such as the receiver 920. The BB-processing block 940 may be operable to encode, decode, transcode, modulate, demodulate, encrypt, decrypt, scramble, descramble, and/or otherwise process data in accordance with one or more wireless standards. In one or more implementations, the baseband-processing block 940 may perform the functionalities of the encoder or decoder as described in the flow diagrams of FIGS. 2A and 3.

The processor 960 may comprise suitable logic, circuitry, and/or code that may enable the processing of data and/or controlling operations of the wireless communication device 900. In this regard, the processor 960 may be enabled to provide control signals to various other portions of the electronic system 900. The processor 960 may also control the transfer of data between or among various portions of the electronic system 900. Additionally, the processor 960 may enable implementation of an operating system or otherwise execute code to manage the operations of the electronic system 900. In one or more implementations, the processor 960 may perform some of the functionalities of an encoder or a decoder as described in the flow diagrams of FIGS. 2A and 3.

The memory 950 may comprise suitable logic, circuitry, and/or code that may enable storage of various types of information such as received data, generated data, code, and/or configuration information. The memory 950 may comprise, for example, RAM, ROM, flash, and/or magnetic storage. In various embodiments of the subject technology, information stored in the memory 950 may be utilized for configuring the receiver 920 and/or the BB-processing block 940.

The LOGEN 970 may comprise suitable logic, circuitry, interfaces, and/or code that may be operable to generate one or more oscillating signals of one or more frequencies. The LOGEN 970 may be operable to generate digital and/or analog signals. In this manner, the LOGEN 970 may be operable to generate one or more clock signals and/or sinusoidal signals. Characteristics of the oscillating signals such as the frequency and duty cycle may be determined based on one or more control signals from, for example, the processor 960 and/or the baseband-processing block 940.

In operation, the processor 960 may configure the various components of the electronic system 900 based on a wireless standard according to which it is desired to receive signals. Wireless signals may be received via the RF antenna 910, amplified, and downconverted by the receiver 920. The BB-processing block 940 may perform noise estimation and/or noise cancellation, decoding, and/or demodulation of the baseband signals. In this manner, information in the received signal may be recovered and utilized appropriately. For example, the information may be audio and/or video to be presented to a user of the electronic system 900, data to be stored to the memory 950, and/or information affecting and/or enabling the operation of the electronic system 900. The BB-processing block 940 may modulate, encode, and perform other processing on audio, video, and/or control signals to be transmitted by the transmitter 930 in accordance with various wireless standards.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one," unless specifically so stated, but rather "one or more." Unless specifically stated otherwise, the term "some" refers to "one or more." Pronouns in the masculine gender (e.g., his) include the feminine and neuter genders (e.g., her and its) and vice versa. Headings and subheadings, if any, are used for convenience only and do not limit the subject disclosure.

The predicate words "configured to," "operable to," and "programmed to" do not imply any particular tangible or intangible modification of a subject, but rather are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations or one or more configurations. A phrase such as "an aspect" may refer to one or more aspects and vice versa. A phrase such as "a configuration" does not imply that such configuration is essential to the subject technology or that such configuration applies to all configurations of the subject technology. A disclosure relating to "a configuration" may apply to all configurations, or one or more configurations. A phrase such as a configuration may refer to one or more configurations and vice versa.

The word "example" is used herein to mean "serving as an example or illustration." Any aspect or design described herein as "an example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the terms "include," "have," or the like are used in the description or the claims, such terms are intended to be inclusive in a manner similar to the term "comprise," as "comprise" is interpreted when employed as a transitional word in a claim.

Those of skill in the art would appreciate that the various illustrative blocks, modules, elements, components, methods and algorithms described herein may be implemented as electronic hardware, computer software, or combinations of both. To illustrate this interchangeability of hardware and software, various illustrative blocks, modules, elements, components, methods and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

What is claimed is:

1. A method comprising:
   encoding, by an encoder, a video frame of a video-compression system, by:
   retrieving tile information associated with a video frame;
   determining, for a slice, that the slice is a subset or a superset of a tile, based on the tile information;
   determining slice parameters associated with the slice, wherein the slice parameters comprise a width and a height of the slice in units of tiles; and
   signaling the slice parameters associated with the slice.

2. The method of claim 1, wherein the slice comprises a rectangular slice of the video frame and is a superset of a tile.

3. The method of claim 1, wherein the slice comprises a rectangular slice of the video frame and is a subset of a tile.

4. The method of claim 3, wherein the slice parameters associated with the slice include a height of the rectangular slice.

5. The method of claim 1, wherein signaling the slice parameters comprise using tile information rather than brick information.

6. The method of claim 1, further comprising signaling each slice as a number of complete tiles, when it is determined that the slice is a superset of the tile.

7. The method of claim 1, further comprising signaling a location of a next slice aligned to a start of a tile when there is no flag indicating that the slice is in a raster scan order.

8. The method of claim 1, further comprising signaling each slice as a specific type of subset within the tile, when it is determined that the slice is a subset of the tile to prevent illegal partitions from being constructed.

9. The method of claim 8, further comprising signaling a height of the slice in coding-tree units (CTUs) when the slice is not a last slice within the tile.

10. The method of claim 8, further comprising signaling a location of a next slice aligned to a start of a tile when there is no flag indicating that the slice is in a raster scan order.

11. A method comprising:
retrieving, by a decoder of a video-compression system, tile information associated with a video frame;
determining, for a slice, that the slice is a subset or a superset of a tile, based on the tile information;
determining slice parameters associated with the slice, wherein the slice parameters comprise a width and a height of the slice in units of tiles; and
decoding the video frame using the determined slice parameters.

12. The method of claim 11, wherein the slice parameters associated with the slice include a height of the slice.

13. The method of claim 11, wherein signaling the slice parameters comprise using tile information rather than brick information.

14. The method of claim 11, wherein the slice comprises a rectangular slice of the video frame and is a superset of a tile, and wherein the method further comprises decoding each slice as a number of complete tiles.

15. The method of claim 14, further comprising signaling a location of a next slice aligned to a start of a tile when there is no flag indicating that the slice is in a raster scan order.

16. The method of claim 11, wherein the slice comprises a rectangular slice of the video frame and is a subset of a tile, and wherein the method further comprises decoding each slice as a specific type of subset within the tile.

17. The method of claim 16, further comprising decoding a number of slices and a height of the slice that is not a last slice within the tile in units of CTUs.

18. The method of claim 17, further comprising decoding a location of a next slice aligned to a start of a tile when there is no flag indicating that the slice is in a raster scan order.

19. A communication device comprising:
a radio-frequency (RF) transmit (TX) circuit;
a TX baseband module including an encoder configured to:
retrieve tile information associated with a video frame;
determine, for a slice, that the slice is a subset or a superset of a tile, based on the tile information; and
determine slice parameters associated with the slice,
wherein the slice parameters comprise a width and a height of the slice in units of tiles, and
wherein the RF TX circuit is configured to transmit the slice parameters associated with the slice.

20. The communication device of claim 19, further comprising:
an RF receive (RX) circuit configured to receive slice information;
an RX baseband module including a decoder configured to:
determine, for a slice, that the slice is a subset or a superset of a tile, based on the slice information;
determine slice parameters associated with the slice; and
decode the video frame using the determined slice parameters, wherein:
the slice parameters include a dimensions and a location of the slice.

21. A server comprising:
a processor configured to perform video encoding; and
one or more modules executed by the processor to:
retrieve tile information;
determine, for a slice, that the slice is a subset or a superset of a tile, based on the tile information;
determine slice parameters associated with the slice, wherein the slice parameters comprise a width and a height of the slice in units of tiles; and
signal the slice parameters associated with the slice.

22. The server of claim 21, wherein the slice parameters associated with the slice include a dimensions and a location of the slice.

23. The server of claim 21, wherein signaling the slice parameters comprises signaling each slice as a number of complete tiles, when it is determined that the slice is a superset of the tile.

24. The server of claim 21, wherein signaling the slice parameters comprises signaling each slice as a specific type of subset within the tile, when it is determined that the slice is a subset of the tile to prevent illegal partitions from being constructed.

* * * * *